United States Patent

Kelbel

[11] 3,929,029
[45] Dec. 30, 1975

[54] TRANSMISSION SHIFT CONTROL LINKAGE

[75] Inventor: Donald W. Kelbel, Muncie, Ind.

[73] Assignee: Borg-Warner Corporation, Chicago, Ill.

[22] Filed: Feb. 25, 1974

[21] Appl. No.: 445,373

[52] U.S. Cl. .................. 74/473 R; 74/477; 74/375
[51] Int. Cl.².. B60K 23/00; G05G 5/00; F16H 3/08
[58] Field of Search ............ 74/329, 333, 325, 375, 74/473 R, 477

[56] References Cited
UNITED STATES PATENTS

| | | | |
|---|---|---|---|
| 2,356,522 | 8/1944 | Kummich | 74/473 R X |
| 2,923,176 | 2/1960 | Randt | 74/375 X |
| 2,951,392 | 9/1960 | Backus | 74/473 R |
| 3,106,851 | 10/1963 | Ivanchich | 74/335 |
| 3,173,303 | 3/1965 | Galaniuk | 74/375 |
| 3,192,788 | 7/1965 | Fodrea | 74/375 |
| 3,264,893 | 8/1966 | Stott et al. | 74/477 |
| 3,293,933 | 12/1966 | Foxwell | 74/375 X |
| 3,312,119 | 4/1967 | Heald | 74/473 |
| 3,387,501 | 6/1968 | Frost | 74/473 X |
| 3,550,467 | 12/1970 | Forichon | 74/473 R |
| 3,618,416 | 11/1971 | Longshore | 74/333 |

FOREIGN PATENTS OR APPLICATIONS

| | | | |
|---|---|---|---|
| 1,053,353 | 12/1966 | United Kingdom | 74/473 R |

*Primary Examiner*—Samuel Scott
*Assistant Examiner*—Lance W. Chandler
*Attorney, Agent, or Firm*—Julian Schachner

[57] ABSTRACT

A multiple speed, sliding gear transmission characterized by the provision of shift forks and thrust bars defining a bore within which a shift rail rides. The shift rail carries an actuating sleeve rotatable into selective engagement with the thrust bars for subsequent axial movement of the selectively engaged thrust bar and its associated shift fork to establish an appropriate speed ratio. The actuating sleeve carries a locking plate into engagement with the remaining thrust bars to prevent axial movement thereof. The transmission is further characterized by shift control linkage including a lever actuated by a first shift-rail and both pivotal relative to and in frictional driving engagement with second shift rail to provide opposite rotational and axial movement of the shift rails.

16 Claims, 9 Drawing Figures

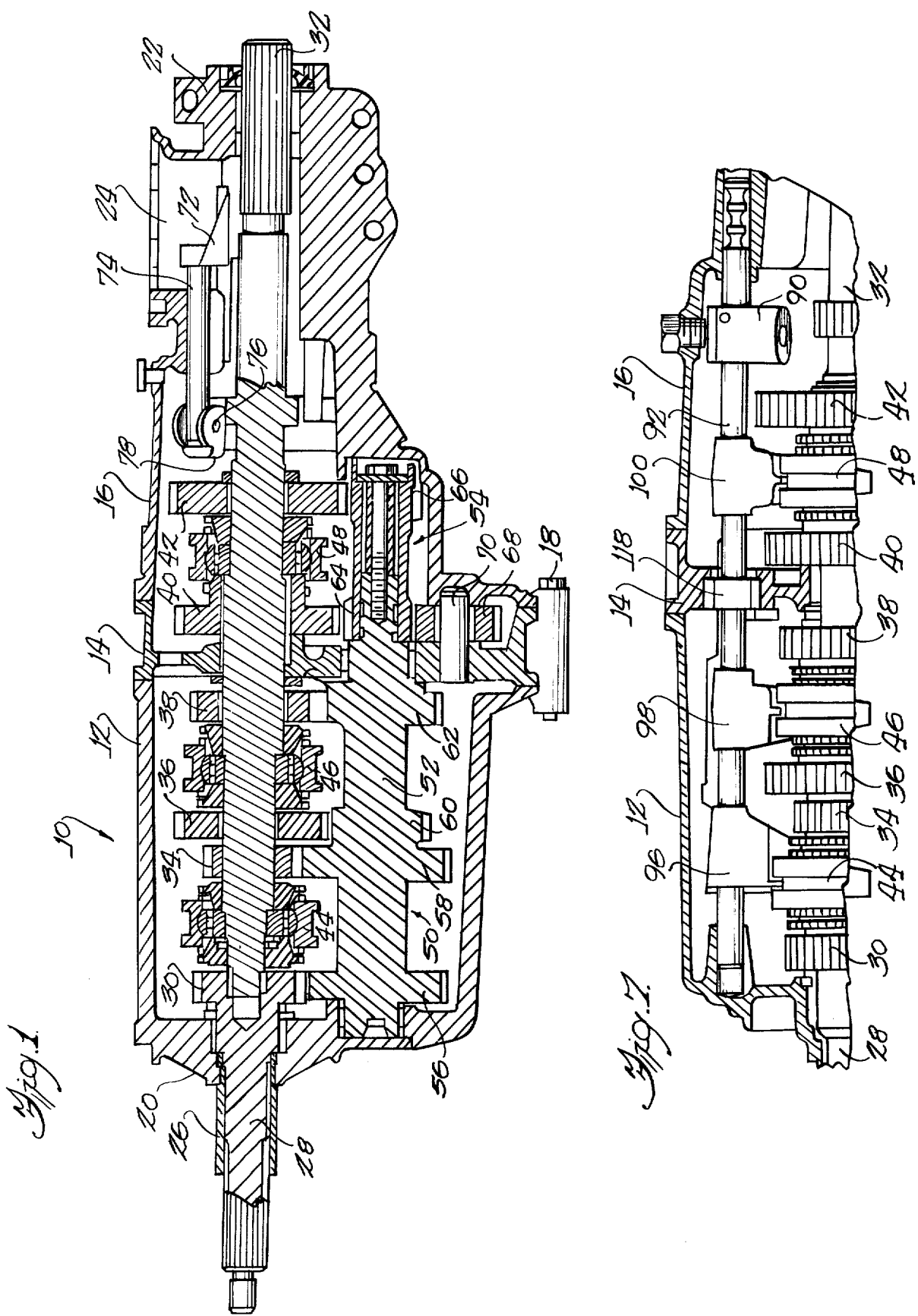

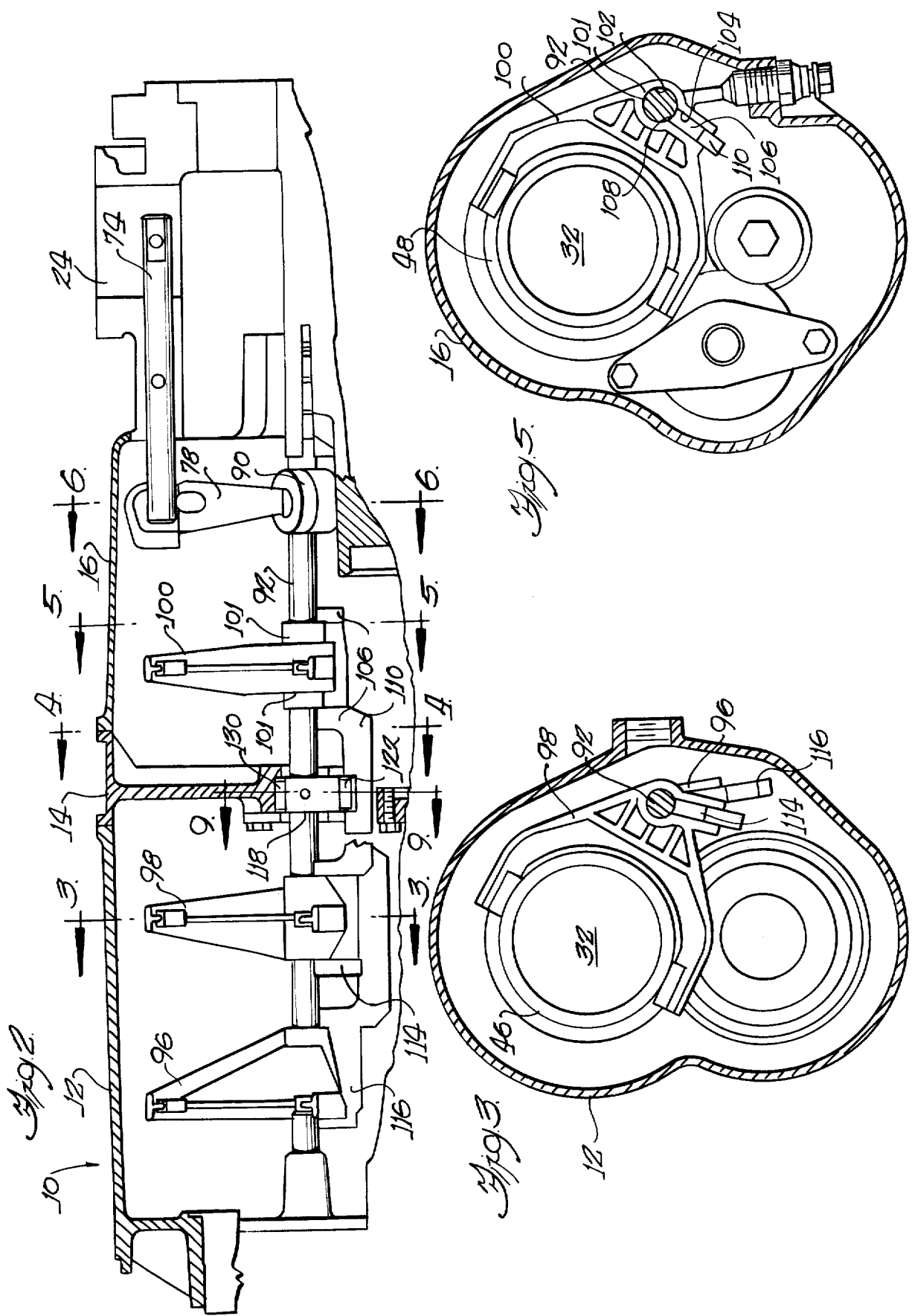

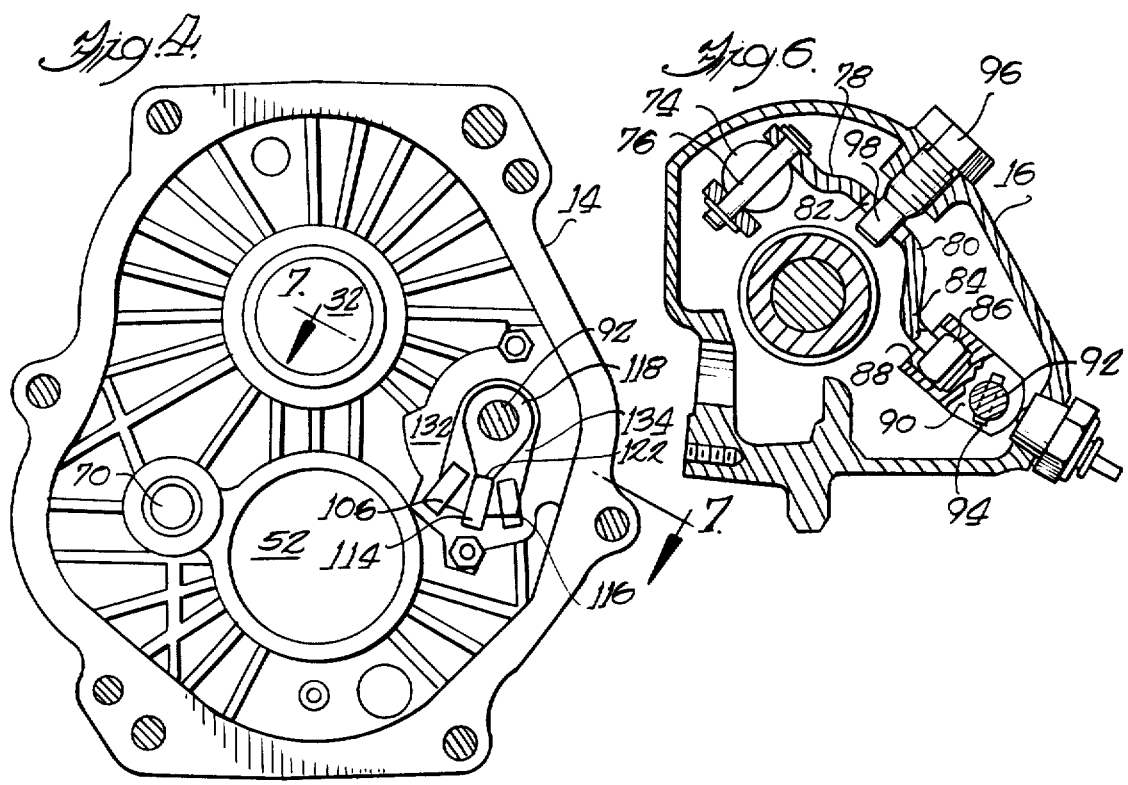
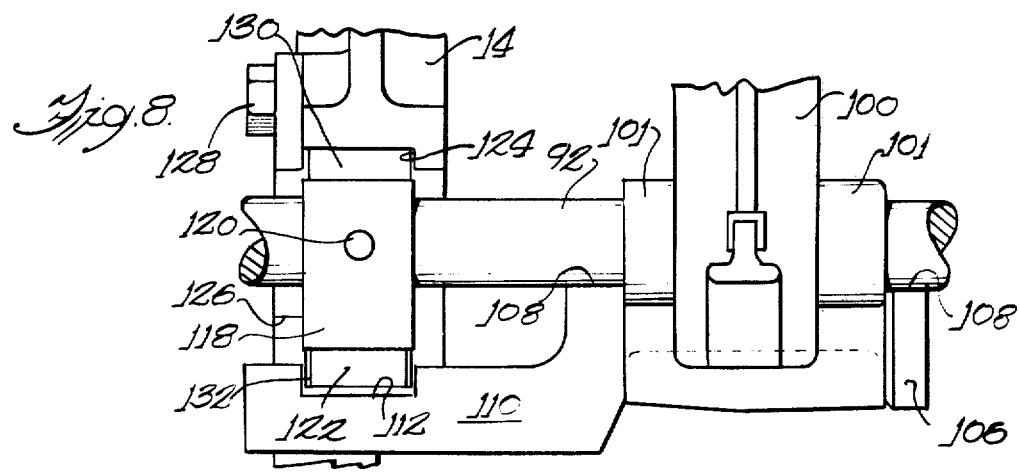
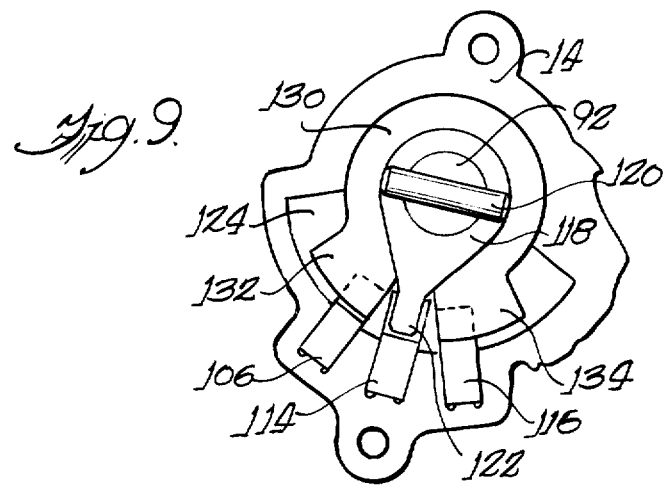

TRANSMISSION SHIFT CONTROL LINKAGE

CROSS-REFERENCE TO RELATED APPLICATION

Copending application Ser. No. 441,679 filed Feb. 11, 1974 of common assignee herewith is incorporated herein by reference.

BACKGROUND OF THE INVENTION

1. Field of the Invention

This invention relates generally to automotive transmissions or the like, and more particularly to a sliding gear manual transmission incorporating improved shift control and linkage mechanisms.

2. Description of the Prior Art

In recent years there have been many improvements in automotive transmissions, including improvements related to shifting of sliding gear manual transmissions. However, there has been a need to provide a simplified shift control and linkage mechanism for establishing desirable shifting movement, and also to provide economical shift elements which exhibit reliability in service.

Accordingly, it is an object of this invention to meet the continuing need and desire in the art for improvements in transmissions by providing a multiple speed, sliding gear manual transmission shift control including shift forks, shift bars and a related actuating mechanism which provide economy yet retain strength and flexibility of use where required. A related object of this invention is to provide an actuating mechanism which successfully prevents all but a single selected gear engagement.

SUMMARY OF THE INVENTION

The invention is directed, in brief, to an improved multiple speed, sliding gear transmission wherein shifting through the gear ratios may be accomplished by selective engagement of actuating means with thrust bars which in turn carry shift forks, while at the same time locking all shift forks not engaged. The engaged shift fork effects on appropriate speed ratio. Also, the thrust bars and shift forks are so related as to allow use of shift forks formed in a relatively economical manner from a relatively economical material.

Die cast aluminum shift forks and steel thrust bars are secured so as to define bores. A shift rail rides in the bores and carries an actuating element for rotational and longitudinal movement therewith. The actuating element engages and carries a locking element.

Rotational movement of the shift rail causes the actuating element to engage one of the thrust bars and to engage the locking element and carry it into engagement with the other thrust bars.

Longitudinal movement of the shift rail causes the actuating element to move its engaged thrust bar and associated shift fork so as to effect establishment of an appropriate speed ratio. The locking element prevents such movement of the other thrust bars and associated shift forks.

Shift linkage includes a lever rotatable with one shift rail in one plane and engaged with another shift rail. The shift linkage is freely pivotable about one shift rail in another plane and engaged with another shift rail. Pivotal movement of the shift linkage is effected by a fulcrum intermediate the shift rails, which fulcrum also guides rotational movement of the shift linkage.

BRIEF DESCRIPTION OF THE DRAWINGS

FIG. 1 is a sectional view of a five-speed transmission embodying the invention;

FIG. 2 is a view similar to that of FIG. 1, partially cut away to show details of the shift rails, the shift forks and the actuating mechanism;

FIG. 3 is a sectional view taken along the line 3—3 of FIG. 2 showing orientation of two shift forks and their actuating mechanism;

FIG. 4 is a sectional view taken along the line 4—4 of FIG. 2 showing orientation of the actuating mechanism including the shift bars;

FIG. 5 is a sectional view taken along the line 5—5 of FIG. 2 showing details of another shift fork and its actuating mechanism;

FIG. 6 is a sectional view taken along the line 6—6 of FIG. 2 showing details of the rail control linkage;

FIG. 7 is a sectional view taken along the line 7—7 of FIG. 4 showing the relationship of the lower shift rail, shift forks and actuating mechanism with respect to the gears and synchronizing clutches;

FIG. 8 is an enlarged fragmentary view showing details of the shift rail and actuating mechanism including the actuating bars; and FIG. 9 is a sectional view taken along the line 9—9 of FIG. 2, partially cut away to show details of the actuating sleeve as related to the shift bars, and details of the interlock plate associated therewith.

While this invention is susceptible of embodiment in many different forms, there is shown in the drawings and will herein be described in detail a preferred embodiment, with the understanding that the present disclosure is to be considered as an exemplification of the principles of the invention and is not intended to limit the invention to this embodiment.

DESCRIPTION OF THE PREFERRED EMBODIMENT

Referring now to the drawings in greater detail, a five-speed transmission 10 is of the type disclosed in copending application Ser. No. 441,679 filed Feb. 11, 1974 of common assignee herewith. Transmission 10 includes a front housing section 12, an intermediate housing section 14 and a rear housing section 16. These sections are preferably die cast aluminum, and are suitably secured together by a plurality of bolts 18 to form a complete housing. Front housing section 12 defines a forward wall 20, and rear housing section 16 defines a rearward wall 22 and an upwardly directed tower opening 24.

A support sleeve 26 of steel extends through a bore defined by forward wall 20 into the interior of the housing, and at several points is crimped against the interior surface of forward wall 20. Details of the structural relationship of sleeve 26 and forward wall 20 are more fully disclosed in the aforementioned application Ser. No. 441,679. Sleeve 26 provides support for transmission 10 during assembly, shipping and installation in an associated vehicle. A snug fit ensures that the sleeve is capable of taking abuse during handling and still providing an aligned mount for an associated clutch release bearing.

It has been found that such a sleeve crimped to the forward wall of a transmission housing provides surprising strength. Sleeve 26 is capable of supporting unbalanced side loads in addition to the associated clutch release bearing and its related mechanisms. Side loads of 1,000 pounds have been supported by such a sleeve. Thus, it should be clear that in handling, and assembling transmission 10 into an automotive vehicle or the like, sleeve 26 may be used in supporting and carrying transmission 10 without imparing its usefulness as a mount.

An input shaft 28 extends coaxially through sleeve 26 into transmission 10 and defines therein an input gear 30. Input shaft 28 is journalled for rotation in forward wall 20 of housing section 12. A suitable seal is provided between forward wall 20 and input shaft 28.

An output shaft 32 is journalled for rotation in input shaft 28, housing section 14 and rearward wall 22 of housing section 16. A suitable seal is provided between rearward wall 22 and output shaft 32. A plurality of spaced output gears 34, 36, 38, 40 and 42 are carried by output shaft 32.

A fourth-fifth ratio synchronizing clutch mechanism 44 is located between input gear 30 and fifth ratio output gear 34. A second-third ratio synchronizing clutch mechanism 46 is located between second ratio output gear 36 and third ratio output gear 38. Similarly, a reverse-first ratio synchronizing clutch mechanism 48 is located between reverse ratio output gear 40 and first ratio output gear 42. Synchronizing clutch mechanisms 44, 46 and 48 may be of the type disclosed in White et al. U.S. Pat. No. 2,221,900 issued Nov. 19, 1940.

Clutch mechanism 44 is moved forwardly to provide fourth or direct ratio directly engaging input gear 30 with output shaft 32, and is moved rearwardly to engage output gear 34 in fifth or overdrive ratio. Clutch mechanism 46 is moved forwardly to engage output gear 36 in second ratio and rearwardly to engage output gear 38 in third ratio. Similarly, clutch mechanism 48 is moved forwardly to engage output gear 40 in reverse ratio and rearwardly to engage output gear 42 in first ratio.

It should be understood that the transmission disclosed herein is one embodiment of the invention and that alternative embodiments in various forms including three, four or five-speed arrangements, for example, would be suitable. A five-speed transmission with direct drive in fifth ratio is one of the embodiments contemplated.

A cluster gear 50 includes a countershaft 52 journalled for rotation in housing sections 12 and 14. Cluster gear 50 also includes a countershaft extension assembly 54 extending rearwardly from countershaft 52 and journalled in housing section 16. Countershaft extension assembly 54 and its relationship to countershaft 52 are disclosed in detail in the aforementioned application Ser. No. 441,679. Briefly, countershaft assembly 54 is movable relative to countershaft 52 so as to compensate for any misalignment of the bearings in which cluster gear 50 is journalled.

Cluster gear 50 includes a drive gear 56 meshing with input gear 30 to provide continuous drive for countershaft 52. Cluster gear 50 also includes a fifth ratio input gear 58, a second ratio input gear 60 and a third ratio input gear 62. These input gears mesh with fifth ratio output gear 34, second ratio output gear 36 and third ratio output gear 38, respectively.

Countershaft extension assembly 54 defines gears 64 and 66. Reverse input gear 64 drives reverse output gear 40 through an intermediate gear 68 carried by a reverse countershaft 70, which in turn is supported by housing sections 14 and 16. First ratio input gear 66 meshes with first ratio output gear 42.

An important feature of this improved transmission is the provision of a desirable, convenient shift pattern. This pattern includes a leftward reverse-first position, a central second-third position and a rightward fourth-fifth position as viewed from the operator's position. To achieve this pattern, it was necessary to arrange the various gear sets as shown herein. The pattern is accomplished by providing that clutch mechanism 44 move forwardly to establish fourth ratio and rearwardly to establish fifth ratio; that clutch mechanism 46 move forwardly to establish second ratio and rearwardly to establish third ratio; and that clutch mechanism 48 move forwardly to establish reverse ratio and rearwardly to establish first ratio.

To achieve the pattern within a very compact transmission housing it was necessary to provide upper and lower shift rails which move in opposite directions, as disclosed in detail in the aforementioned application Ser. No. 441,679. A bell crank 72 is connected to an upper shift rail 74 suitably supported in housing section 16 for both rotary and axial motion. Upper shift rail 74 is loosely connected by means of an appropriate pivot pin 76 with a lever 78. Lever 78 has an offset central portion 80 of bifurcated configuration thereby defining a slot 82. Lower portion 84 of lever 78 supports a spherical ball 86 which in a preferred form may be a pair of spherical elements snapped into position. Spherical ball 86 is frictionally accommodated in a socket 88 formed at one end of a link member 90. Link member 90 is secured to a lower shift rail 92 by means of a suitable pin 94. A bolt 96 is threaded into housing section 16 and extends into the interior thereof. Bolt 96 has an extension in the form of a stud 98 extending through slot 82 of bifurcated central portion 80.

A conventional control tower is supported on housing section 16 above opening 24. A suitable gear shift stick extends into opening 24 and is engaged with bell crank 72. Appropriate movement of the stick will effect the desired shifting pattern. For example, as the stick is moved leftward or rightward, bell crank 72 will cause upper shift rail 74 to rotate. This in turn causes lever 78 to pivot about upper shift rail 74 with stud 98 serving as a guide. The ball and socket relationship 86-88 causes link member 90 to pivot, thereby rotating lower shift rail 92 in a direction opposite to that of upper shift rail 74.

A plurality of shift forks 96, 98 and 100 engage synchronizing clutch mechanisms 44, 46 and 48, respectively. Shift forks 96, 98 and 100 are carried by lower shift rail 92 for movement thereby so as to selectively move synchronizing clutch mechanisms 44, 46 and 48 in appropriate gear engaging relationships.

As most clearly shown in FIGS. 2, 5 and 8, shift forks 96, 98 and 100 are carried by lower shift rail 92. Typically, shift fork 100 includes a sleeve 101 which defines a keyhole shaped opening including a bore portion 102 and a slot portion 104. A thrust bar 106 is closely slip fit into slot portion 104 and defines an end surface 108 complementary to bore portion 102 and defining therewith a bore within which lower shift rail 92 rides. Thrust bar 106 has an extension 110 with a notch 112 therein. It should be understood that similar relationships exist between shift forks 96 and 98 and thrust bars 114 and 116, respectively. Thrust bars 106, 114 and 116 are slidably received in housing portion 14, each with a notch similar to notch 112 and in alignment therewith.

A distinct advantage of this invention is that shift forks 96, 98 and 100 may be of die cast aluminum, whereas thrust bars 106, 114 and 116 may be formed of steel and engaged with their respective shift forks. This is desirable because the shift forks are not subjected to forces which normally would cause failure or rapid wear, and thus may be formed more simply and economically then heretofore thought possible. The thrust bars, on the other hand, are formed of steel where added strength is required.

A sleeve 118 is carried by lower shift rail 92 and secured thereto by a pin 120 for rotary and axial movement therewith. Sleeve 118 defines a depending finger 122 rotatable with lower shift rail 92 into selective engagement with the notches defined by thrust bars 106, 114 and 116. Upon engagement, sleeve 118 is movable axially with lower shift rail 92, and finger 122 moves the engaged thrust bar and its associated shift fork sufficiently to cause one of synchronizing clutch mechanisms 44, 46 and 48 to engage the appropriate gear.

To ensure movement of only one shift fork 96, 98 or 100 at any time, an interlock mechanism is provided. A chamber 124 is formed by housing section 14 and cover 126, secured thereto by suitable bolts 128. A plate 130 loosely surrounds sleeve 118 within chamber 124 and defines depending locking portions 132 and 134. As most clearly shown in FIG. 9, as sleeve 118 rotates, finger 122 abuts either locking portions 132 or 134 and carries with it plate 130. Locking portions 132 and 134 are moved into locking position in those notches of thrust bars 106, 114 or 116 which are not engaged by finger 122. For example, upon clockwise rotation of lower shift rail 92, sleeve 118 and its associated finger 122 will likewise be rotated in the clockwise direction. Finger 122 will engage locking portion 132 of plate 130 and to carry it into locking engagement with thrust bar 106 when finger 122 is moved into engagement with thrust bar 114. At the same time, locking portion 134 of plate 130 is carried into locking engagement with thrust bar 116. Upon continued clockwise rotation of sleeve 118, finger 122 is moved into engagement with thrust bar 106 and locking portion 134 is carried into locking engagement with thrust bars 114 and 116. Sleeve 118 is movable axially with lower shift rail 92, whereas axial movement of plate 130 is limited by chamber 124. Thus, upon axial movement of lower shift rail 92, only the thrust bar selectively engaged by finger 122 will shift axially, as plate 130 will prevent the remaining thrust bars from shifting axially.

Forward or rearward movement of the stick will cause responsive axial movement of upper shift rail 74. As upper shift rail 74 moves axially, stud 98 of bolt 96 acts as a fulcrum about which lever 78 pivots, as lever 78 is free to pivot about pivot pin 76. The result is that forward axial movement of upper shift rail 74 will cause rearward axial movement of lower shift rail 92. Similarly, rearward axial movement of upper shift rail 74 will cause forward axial movement of lower shift rail 92. By this means, engagement of appropriate shift forks 96, 98 and 100 selectively with synchronizing clutch mechanisms 44, 46 and 48 produces the desired shift pattern within a compact transmission housing.

The relative effective lengths of lever 78 and link member 90 determine the mechanical advantage obtained in effecting rotary movement of lower shift rail 92. Similarly, the position of bolt 96 determines the fulcrum point for lever 78 and thus its mechanical advantage in effecting axial movement of lower shift rail 92.

In a preferred form of the invention, first gear provides a reduction of 3.41, second gear a reduction of 2.08, third gear a reduction of 1.40, fourth gear direct drive and fifth gear overdrive with a ratio of 0.80. The reduction in reverse gear is 3.36. Various other ratios may be provided as desired. For example, with minimal changes fourth gear may provide a suitable reduction and fifth gear may provide direct drive.

It should be apparent that although the invention provides a novel arrangement for a five-speed sliding gear transmission, it is readily convertible for use in three or four speed or other sliding gear transmission assemblies with or without overdrive. Further, it should be understood that while a preferred embodiment of the invention has been shown and described, this should be considered as illustrative and may be modified by those skilled in the art without departing from the scope thereof, which is to be limited only by the claims herein.

I claim:

1. In a transmission including a housing, an input shaft and an output shaft journalled in said housing, at least one gear journalled on one of said shafts, and a clutching element supported by said one shaft and movable for selectively engaging said gear with said shaft to establish a drive ratio; the improvement comprising a shift fork engaging said clutching element, a bar formed from a harder material than said shift fork and secured to said shift fork for movement therewith, said bar and shift fork together defining a bore, and a shift rail movable in said bore and selectively engageable with said bar upon movement thereof, the bar and shift fork movable to establish said drive ratio upon further movement of said shift rail.

2. The invention according to claim 1, said bar defining a notch, and a sleeve carried by said shift rail and defining a finger extending therefrom and selectively rotatable into said notch for effecting said selective engagement of said shift rail with said bar.

3. The invention according to claim 1, said shift fork being formed from a less dense material than said bar.

4. The invention according to claim 1, said shift fork being formed from aluminum, and said bar being formed from steel.

5. In a transmission including a housing, an input shaft journalled in said housing and defining an input gear, an output shaft journalled in said housing, a plurality of output gears journalled on said output shaft, a cluster gear assembly journalled in said housing and defining a ratio input gear driven by said input gear and a plurality of ratio output gears respectively in driving relationship with said output gears, and a plurality of clutching elements supported by said output shaft and movable for selectively engaging said output gears with said output shaft to establish a plurality of drive ratios; the improvement comprising a plurality of shift forks respectively contacting said clutching elements for effecting movement thereof, each shift fork defining a bore portion, a plurality of bars formed from a harder material than said shift forks and respectively secured to said shift forks for movement therewith, each bar defining a complementary bore portion whereby each associated shift fork and bar together define a bore, and shift means including a shift element movable in said bores and selectively engageable with said bars upon initial movement of said shift means, the engaged bar and its associated shift fork being movable to establish one of said drive ratios upon subsequent movement of said shift means.

6. The invention according to claim 5, said shift means including a lock element engageable with the remainder of said bars upon said selective engagement of said shift element with one of said bars, said lock element preventing movement of the remainder of said bars upon subsequent movement of said shift means.

7. The invention according to claim 6, said shift means defining a shift rail in said bores, said initial movement of said shift means being rotational movement of said shift rail.

8. The invention according to claim 7, each bar defining a notch, said shift element being a sleeve carried by said shift rail and defining a finger extending therefrom and selectively rotatable into said notches for effecting said selective engagement.

9. The invention according to claim 7, said subsequent movement of said shift means being axial movement of said shift rail.

10. The invention according to claim 5, said shift forks being formed from a less dense material than said bars.

11. The invention according to claim 5, said shift forks being formed from aluminum, and said bars being formed from steel.

12. In combination, a plurality of relatively soft movable elements each defining a keyhole-shaped opening therein including a bore portion and a slot portion, a plurality of relatively hard bars each secured in a respective slot portion and defining a complementary bore portion, said elements and bars thereby defining a plurality of bores, and a shaft extending through said bores and being rotatably and axially movable therein, said shaft having a finger extending therefrom, each bar defining a notch selectively engageable by said finger upon rotational movement of said shaft, each engaged bar and associated element being movable with said shaft upon axial movement thereof.

13. The invention according to claim 12, a plate movable into engagement with the remainder of said notches upon rotational movement of said shaft, said plate preventing movement of the remainder of said bars and associated elements with said shaft upon axial movement thereof.

14. In a transmission including drive means and clutch means engageable therewith for establishing a driving condition thereof, the improvement comprising a shift fork for engaging said clutch means, a thrust bar formed from a harder material than said shift fork and engaging said shift fork, and shift means engageable with said thrust bar and movable for effecting engagement of said clutch means with said drive means.

15. The invention according to claim 14 wherein said thrust bar is of a more dense material than said shift fork.

16. The invention according to claim 14 wherein said thrust bar has a notch therein engaging said shift fork in a close slip fit.

* * * * *